United States Patent
Vasquez et al.

(10) Patent No.: US 8,731,172 B2
(45) Date of Patent: *May 20, 2014

(54) METHOD AND SYSTEM FOR TRUNK INDEPENDENT GATEWAY TRANSFER OF CALLS

(71) Applicant: Verizon Patent and Licensing Inc., Basking Ridge, NJ (US)

(72) Inventors: Juan M. Vasquez, San Jose, CA (US); Prashant B. Desai, Land O'Lakes, FL (US); Mayuresh Mohan Hegde, Irving, TX (US); Parind S. Poi, Lewisville, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/855,500

(22) Filed: Apr. 2, 2013

(65) Prior Publication Data
US 2013/0215737 A1     Aug. 22, 2013

Related U.S. Application Data

(63) Continuation of application No. 12/339,575, filed on Dec. 19, 2008, now Pat. No. 8,428,243.

(51) Int. Cl.
*H04M 3/58* (2006.01)
*H04L 12/66* (2006.01)

(52) U.S. Cl.
USPC ............... 379/212.01; 370/352; 370/401

(58) Field of Classification Search
USPC ............... 370/352, 401; 379/212.01
See application file for complete search history.

(56) References Cited

U.S. PATENT DOCUMENTS

| | | | |
|---|---|---|---|
| 5,878,127 A * | 3/1999 | Fleischer, III | 379/221.08 |
| 6,195,714 B1 * | 2/2001 | Li et al. | 710/31 |
| 6,275,574 B1 * | 8/2001 | Oran | 379/201.01 |
| 7,519,732 B2 * | 4/2009 | Yeom | 709/238 |
| 7,957,517 B2 * | 6/2011 | Ricciardi et al. | 379/212.01 |
| 8,428,243 B2 * | 4/2013 | Vasquez et al. | 379/212.01 |
| 2002/0131401 A1 * | 9/2002 | Ehreth | 370/352 |
| 2003/0095541 A1 * | 5/2003 | Chang et al. | 370/352 |
| 2004/0215828 A1 * | 10/2004 | Li et al. | 709/246 |
| 2005/0041785 A1 * | 2/2005 | Joseph | 379/88.17 |
| 2009/0296914 A1 * | 12/2009 | Vasquez et al. | 379/212.01 |
| 2009/0316687 A1 * | 12/2009 | Kruppa | 370/352 |
| 2010/0158234 A1 * | 6/2010 | Vasquez et al. | 379/212.01 |
| 2013/0177014 A1 * | 7/2013 | Kell et al. | 370/352 |

* cited by examiner

*Primary Examiner* — Harry S Hong

(57) ABSTRACT

Techniques for providing a method and system for trunk independent gateway transfer of calls are disclosed. In one particular exemplary embodiment, the techniques may be realized as a computer implemented method, comprising receiving a call transfer request for a call at a gateway and determining, using a processor of the gateway, whether a trunk to be used for transferring the call requires a transfer command. In the event the trunk requires transfer command, the techniques comprise generating a transfer command, and transferring the call using the transfer command.

19 Claims, 3 Drawing Sheets

METHOD AND SYSTEM FOR TRUNK INDEPENDENT GATEWAY TRANSFER OF CALLS

CROSS REFERENCE TO RELATED APPLICATION

The subject application is a Continuation Application of U.S. application Ser. No. 12/339,575, filed Dec. 19, 2008, which is hereby incorporated by reference in its entirety.

BACKGROUND INFORMATION

Interactive Voice Response Systems (IVRs), Automated Call Distribution (ACD) Systems, Voice Portals and other telecommunications interaction and management systems are increasingly used to provide services for clients, employees and other users. Such systems may frequently be communicatively coupled to one phone or data network and may be communicatively coupled to other networks by a gateway. For example, an Interactive Voice Response (IVR) System of a service provider may be communicatively coupled to an Internet Protocol (IP) based network and may be communicatively coupled to one or more circuit switched networks via one or more gateways. The IVR System may receive a call to be transferred across a gateway via a trunk to a destination number. The IVR System may not know the type of a trunk to be used for the destination call. Different types of trunks may require different call signaling mechanisms. Thus, some IVR Systems may not be able to transfer calls to some trunks and may use work around mechanisms such as the gateway initiating a second call and conferencing the two calls together. The inability to transfer a call may lead to the use of additional connections and may require a call to continue the use of Interactive Voice Response (IVR) System resources and/or gateway resources as the call may be routed through these resources instead of transferred off of them.

Furthermore, a gateway may be capable of utilizing two or more different types of trunks. IVR Systems, ACD Systems, Voice Portals and other telecommunications interaction and management systems, however, may not have information about the type of trunk to be used for the destination call. These Automated Call Distribution (ACD) Systems, Voice Portals or other telecommunications interaction and management system may attempt to transfer a call to a destination number in a format compatible for a first type of trunk but the transfer may fail if the trunk used is a second type of trunk. For example, a first type of trunk may use two channels: a data or bearer channel and a control channel. A second type of trunk may use a single channel with in-band signaling, such as one or more dual-tone multi-frequency (DTMF) tones. A gateway may receive the call and may know how to transfer the call to a first type of trunk with two channels but may not know how to transfer to a second type of trunk using in-band signaling. Thus if the call is destined for the second type of trunk requiring in-band signaling, the call may be dropped. Accordingly, gateways may be incapable of transferring a call to a call destination back on an originating network or other network, such as a circuit switched telephone network.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION OF PREFERRED EMBODIMENTS

Reference will now be made in detail to exemplary embodiments, examples of which are illustrated in the accompanying drawings. It should be appreciated that the same reference numbers will be used throughout the drawings to refer to the same or like parts. It should be appreciated that the following detailed description are exemplary and explanatory only and are not restrictive.

An exemplary embodiment provides a trunk independent gateway transfer system to one or more networks. The trunk independent gateway transfer system may present improved call handling for one or more users of the trunk independent gateway transfer system. For example, a trunk independent gateway system may enable the transfer of a call to one or more trunk types on a circuit switched network without requiring a transfer requesting system to be aware of the trunk type. This may enable the usage of a single format of call transfer request regardless of the type of trunk being used for a transferred call.

Figure 1:
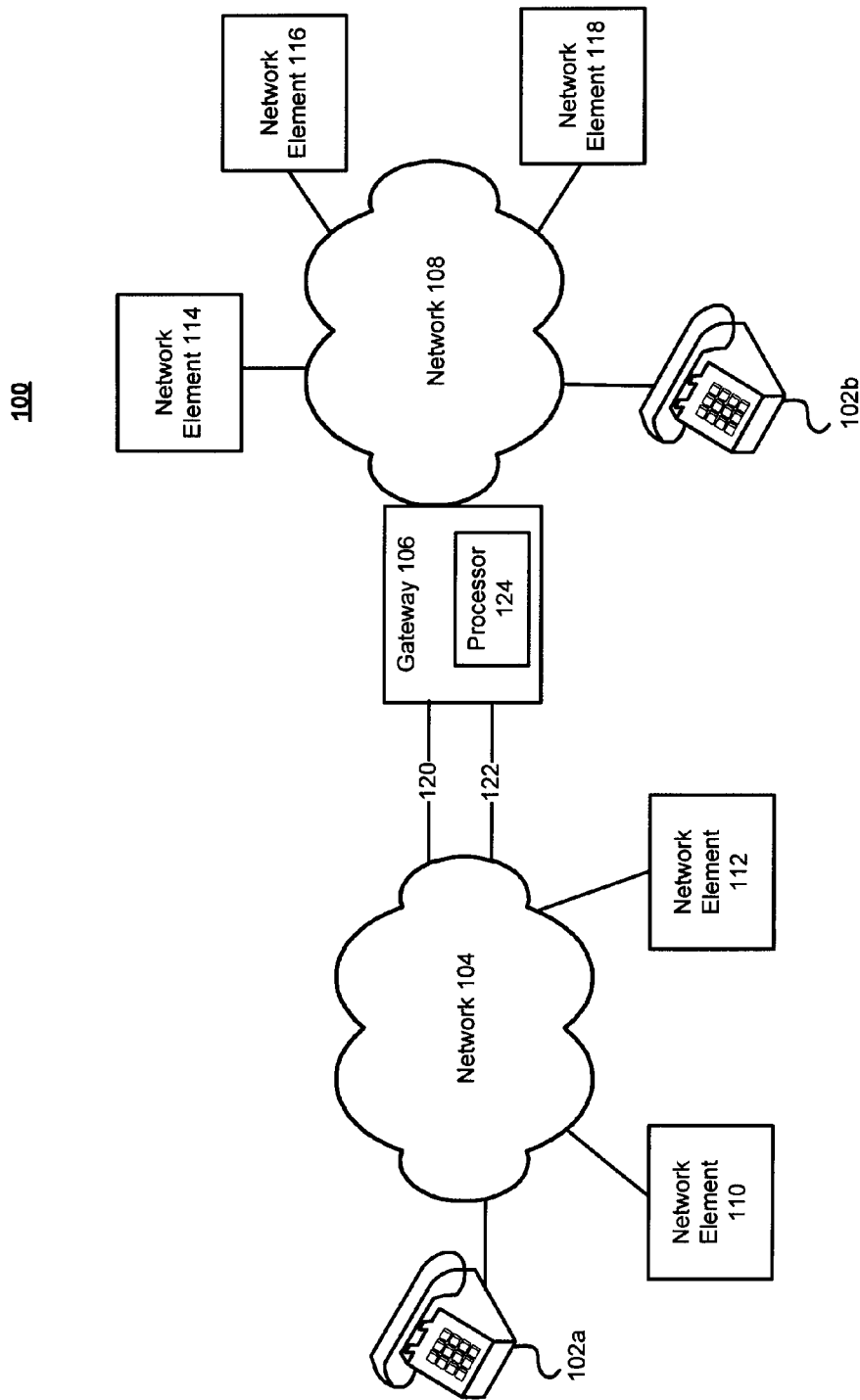
FIG. 1 is a schematic of a trunk independent gateway transfer system, in accordance with an exemplary embodiment.

Referring to FIG. 1, a trunk independent gateway transfer system in accordance with an exemplary embodiment is illustrated. System 100 illustrates an exemplary system for improving call handling at a gateway. It is noted that system 100 is a simplified view of a network and may include additional elements that are not depicted. As illustrated, the system 100 may include one or more networks, such as network 104 and network 108. Networks 104 and 108 may be communicatively coupled to the gateway 106 via trunk 120 and trunk 122. One or more telecommunication devices 102*a* and 102*b* may be communicatively coupled to networks 104 and 108. Other network elements, such as network elements 110, 112, 114, 116, and 118 may be communicatively coupled to networks 104 and/or 108.

The telecommunication devices 102 may be a wireline phone, a wireless phone, a satellite phone, Personal Digital Assistant (PDA), computer, or other telecommunications enabled devices. The telecommunication devices 102 may be communicatively coupled to the network 104 and 108. The telecommunication devices 102 and network elements 110, 112, 114, 116 and 118 may send and receive data using one or more protocols. For example, data may be transmitted and/or received using Wireless Application Protocol (WAP), Multimedia Messaging Service (MMS), Enhanced Messaging Service (EMS), Short Message Service (SMS), Global System for Mobile Communications (GSM) based systems, Time Division Multiplexing (TDM) based systems, Code Division Multiple Access (CDMA) based systems, Transmission Control Protocol/Internet (TCP/IP) Protocols, or other protocols and/or systems suitable for transmitting and receiving data. Data may be transmitted and/or received wirelessly or may use cabled network connections or telecom connections such as an Ethernet RJ45/Category 5 Ethernet connection, a fiber connection, a traditional phone wireline connection, a cable connection or other wired network connection. Network elements 110, 112, 114, 116, and 118 may use standard wireless protocols including IEEE 802.11a, 802.11b and 802.11g. Network elements 110, 112, 114, 116, and 118 may also be communicatively coupled via protocols for a wired connection, such as an IEEE Ethernet 802.3.

Networks 104 and 108 may be local area networks (LAN), wide area networks (WAN), the Internet, a Public Switched Telephone Network (PSTN), cellular networks, satellite networks, or other networks that permit that transfer and/or reception of data.

Network elements 110, 112, 114, 116, and 118 may each be one or more servers (or server-like devices), such as a Session Initiation Protocol (SIP) server. Network elements 110, 112, 114, 116, and 118 may be telecom switches, Private Branch Exchanges (PBXs), Voice Response Units (VRUs), announcement servers, voice mail servers and/or voice portals. Network elements 110, 112, 114, 116, and 118 may be VoIP (Voice Over Internet Protocol) enabled devices. Network elements 110, 112, 114, 116, and 118 may include one or more processors (not shown) for recording, transmitting, receiving, and/or storing data. Although network elements 110, 112, 114, 116, and 118 are depicted as individual servers, it should be appreciated that the contents of network elements 110, 112, 114, 116, and 118 may be combined into fewer or greater numbers of servers (or server-like devices) and may be connected to one or more data storage systems (not shown). Data storage systems may be local or remote to network elements 110, 112, 114, 116, and 118.

The gateway 106 may be a media gateway interconnecting two or more networks. For example, the gateway 106 may enable the routing of calls and other data between a first network 104 and a second network 108. The gateway 106 may include one or more processors, such as processor 124, to enable routing determinations and other determinations. The gateway 106 may contain or be communicatively coupled to other components (not shown) such as storage, memory, and/or one or more interfaces. The gateway 106 may enable the routing of calls between different network types such as between a circuit switched network and a packet switched network. In one or more embodiments, the gateway 106 may be replaced by a switch (not shown) connecting two IP networks. In other embodiments, the gateway 106 may be replaced by a switch (not shown) connecting two circuit switched networks. In some embodiments, the gateway 106 may be replaced by a switch (not shown) connecting two portions of the same network. Although network 108 is depicted as having a single gateway 106 communicatively coupled to two trunks, in one or more embodiments, a plurality of gateways may be connected to network 108 each containing one or more trunks.

In one or more embodiments, network 104 may represent a circuit switched network and network 108 may be a IP based network. Gateway 106 may receive one or more call transfer requests from one or more network elements communicatively coupled to network 108. For example, network element 114 may be an Interactive Voice Response System (IVR), an Automated Call Distribution (ACD) System, a Voice Portal or other telecommunications interaction and management system. Out-of band signaling trunk 122 may be a trunk utilizing Two B Channel Transfer (TBCT) or other out of band signaling mechanisms for one or more call transfers. In-band signaling trunk 120 may be a trunk utilizing in-band call signaling. Network element 114 may receive a call from a user at telecommunications device 102a. Network element 114 may make a determination to transfer a call to network element 110, a Private Branch Exchange (PBX) associated with a call center, via trunk 120. Network element 110 may not have a way to determine the type of a trunk. Gateway 106 upon receipt of a call transfer request may identify the trunk to be used for routing the call. After identifying the trunk, gateway 106 may determine the type of trunk to be used. Depending on the type of trunk, gateway 106, may facilitate in-band and/or out-of-band signaling to complete the call transfer. In the above example, trunk 120 may be a trunk utilizing in-band signaling such as the use of one or more dual-tone multi-frequency (DTMF) tones. Gateway 106 may generate, download, receive, and/or concatenate one or more tones for use with in-band signaling.

In one or more embodiments, gateway 106 may receive destination information from a call transfer request. Gateway 106 may parse a call transfer request to determine a call destination, a trunk to use and/or other information. For example, network 108 may be a network utilizing Session Initiation Protocol (SIP). Gateway 106 may receive a call transfer request as a Session Initiation Protocol (SIP) refer message (e.g., a call transfer request compliant with RFC 3515). The Session Initiation Protocol (SIP) refer message may contain routing information used by the gateway to transfer the call. Gateway 106 may then generate transfer information such as in-band signaling to transfer the call for trunks utilizing in-band signaling. If a call is to be transferred to a trunk utilizing a secondary or D (data) channel for signaling, gateway 106 may generate, request, receive or otherwise obtain the appropriate out-of-band control signaling to transfer the call.

In one or more embodiments, a gateway, such as gateway 106, may associate an application with a trunk. When a call is routed for a trunk, the application may be initiated and may use one or more parameters which may be provided by the gateway. For example, gateway 106 may contain a trunk group (not shown) associated with a trunk. Associated with the trunk group may be another logical subdivision, such as dial pairs. An application may be associated with the dial pairs, such that a call destined for the portion of the trunk associated with the dial pairs initiates the application. For example, a Tool Command Language (TCL) script may be used. The TCL script may parse one or more transfer requests, such as a SIP refer message received from an IVR system, and may use routing information contained in the transfer request to generate transfer information.

In one or more embodiments, gateway 106 may determine transfer information utilizing Dialed Number Identification Service (DNIS) information associated with a call, a lookup table, an array, a database, an interface to a local or remote system, mapping rules or other mapping methods. For example, if a transfer request is received and contains incomplete, incorrect, or no information to generate the transfer, gateway 106 may map the call to a destination. In one or more embodiments, gateway 106 may use a default location based on a transfer requestor. As an example, gateway 106 may receive a call transfer request from network element 114, which may be an IVR system. Gateway 106 may route one or more calls received from network element 114 to network element 110 and may generate the corresponding transfer information. In one or more embodiments, gateway 106 may lookup transfer information utilizing information, such as DNIS information associated with the call being transferred.

The various components of the system 100 as shown in FIG. 1 may be further duplicated, combined and/or integrated to support various applications and platforms. Additional elements may also be implemented in the systems described above to support various applications.

Figure 2:
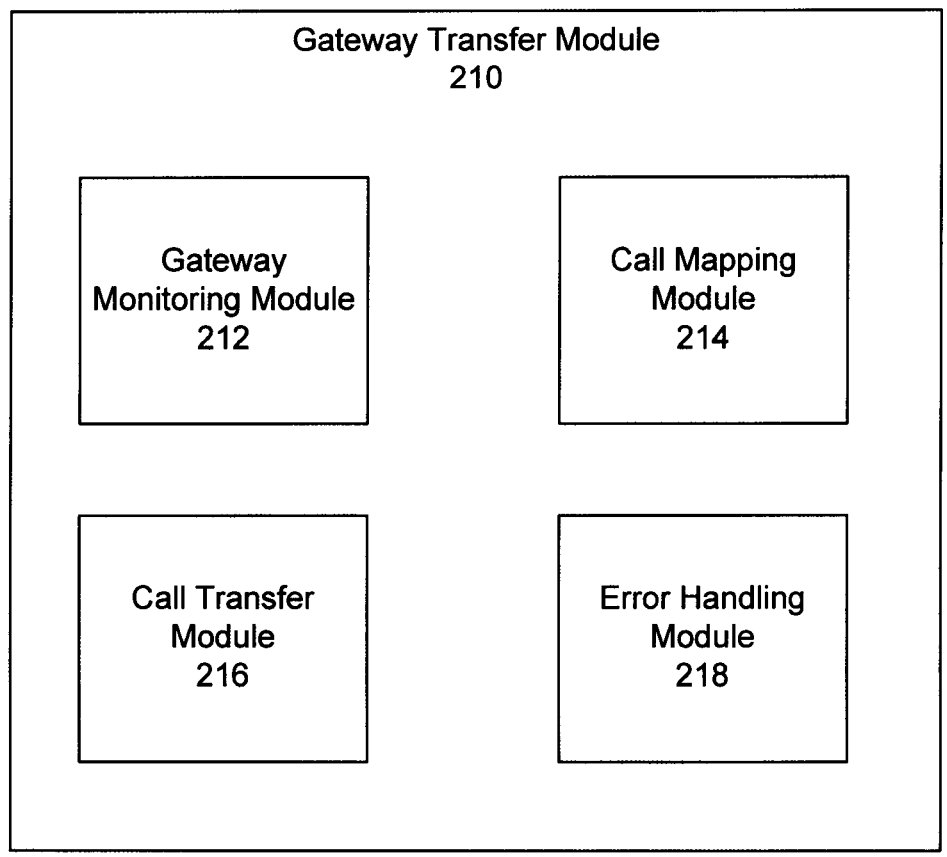
FIG. 2, depicts a block diagram of a gateway transfer module for a trunk independent gateway transfer system, in accordance with an exemplary embodiment.

Referring to FIG. 2, a gateway transfer module 210 for improved gateway call handling is depicted, in accordance with an exemplary embodiment. As illustrated, the gateway transfer module 210 may contain one or more components including a gateway monitoring module 212, a call mapping module 214, a call transfer module 216, and an error handling module 218. The gateway transfer module 210 may improve call handling for transfer requests.

The gateway monitoring module 212 may monitor calls to determine if they meet one or more conditions. The gateway monitoring module 212 may identify transfer requests or failed transfer calls. The gateway monitoring module 212 may identify to the call mapping module 214 call requests that require a transfer or failed transfer calls.

The call mapping module 214 may use information in a call transfer request to determine call destination information. For example, a call transfer request may be a SIP refer request which may contain call destination information to be parsed by the call mapping module 214. In one or more embodiments, the call mapping module 214 may receive one or more call attributes or DNIS information associated with a call. The call mapping module 214 may use call attributes, DNIS information, or other information to query a lookup table, an array, a database, an interface to a local or remote system, mapping rules or other mapping methods to determine one or more call destinations. Mapping rules or logic may use a time of day, a call origination geographic location, a call destination geographic location, a load or utilization of an alternate call destination, caller information associated with a call, priority information associated with a call, or other factors to determine one or more call destinations. In some embodiments, the call mapping module 214 may provide one or more default call destinations. Once a call destination is identified, the call transfer module 216 may be used to transfer the call.

The call transfer module 216 may receive one or more alternate call destinations from the call mapping module 214. The call transfer module 216 may identify a trunk to be used for a call destination and may determine if one or more actions should be taken to transfer the call. The call transfer module 216 may reside on a gateway or may query a gateway to determine a trunk and/or a trunk type. The gateway may identify the trunk based on the call destination. The call transfer module 216 may identify a type of trunk and a corresponding control signaling format used for the type of trunk. For example, the call transfer module 216 may determine that trunk 120 may be a trunk utilizing in-band signaling such as the use of one or more dual-tone multi-frequency (DTMF) tones. The call transfer module 216 may then generate, download, receive, and/or concatenate one or more tones for use in in-band signaling. The call transfer module 216 may concatenate audio files to provide a single audio file enabling the playing of the audio file to generate a transfer. The call transfer module 216 may then play the tones on the trunk to complete the transfer. In other examples, other techniques, such as Session Initiation Protocol (SIP) call signaling and setup techniques may be used. In one or more embodiments, call transfer module 216 may cancel an original transfer and transfer the a call to an alternate call destination (e.g., perform a "take back and transfer.")

In one or more embodiments, the call transfer module 216 may determine that a trunk, such as trunk 122, uses a secondary or D (data) channel for signaling. The call transfer module 216 may generate, request, receive or otherwise obtain the appropriate out-of-band control signaling to transfer the call.

In one or more embodiments, a gateway and/or an application residing on a gateway may accept a single format of transfer request from an IVR System, an ACD System, a Voice Portal and/or other telecommunications interaction and management systems. This may enable such systems to request a transfer call without knowledge of the type of trunk to be used or its respective signaling and/or communication requirements. Enabling call transfer to a plurality of trunk types using a uniform transfer request type may reduce complexity and overhead in connections between networks, such as between IP based networks and circuit switched networks. A uniform transfer request type may also reduce dropped calls and other errors. A uniform transfer request format may reduce the need for conferencing multiple calls together. Enabling call transfers for a plurality of trunk types may reduce practices such as continuing to route calls through a gateway and/or an IVR System after the IVR System has completed its call handling and conferenced in a call destination. Call transferring may thus reduce traffic and wasted connections by enabling the transferred call to be routed more directly between the caller and the destination.

The error handling module 218 may respond to one or more errors associated with a call transfer request and/or a call transfer. The error handling module 218 may enable error trapping and one or more error handling actions. In some embodiments, the error handling module 218 may provide information about a failed network component such as the failure of one or more of network elements 110, 112, 114, 116, and/or 118. The error handling module 218 may provide information about one or more call routing errors.

Figure 3:
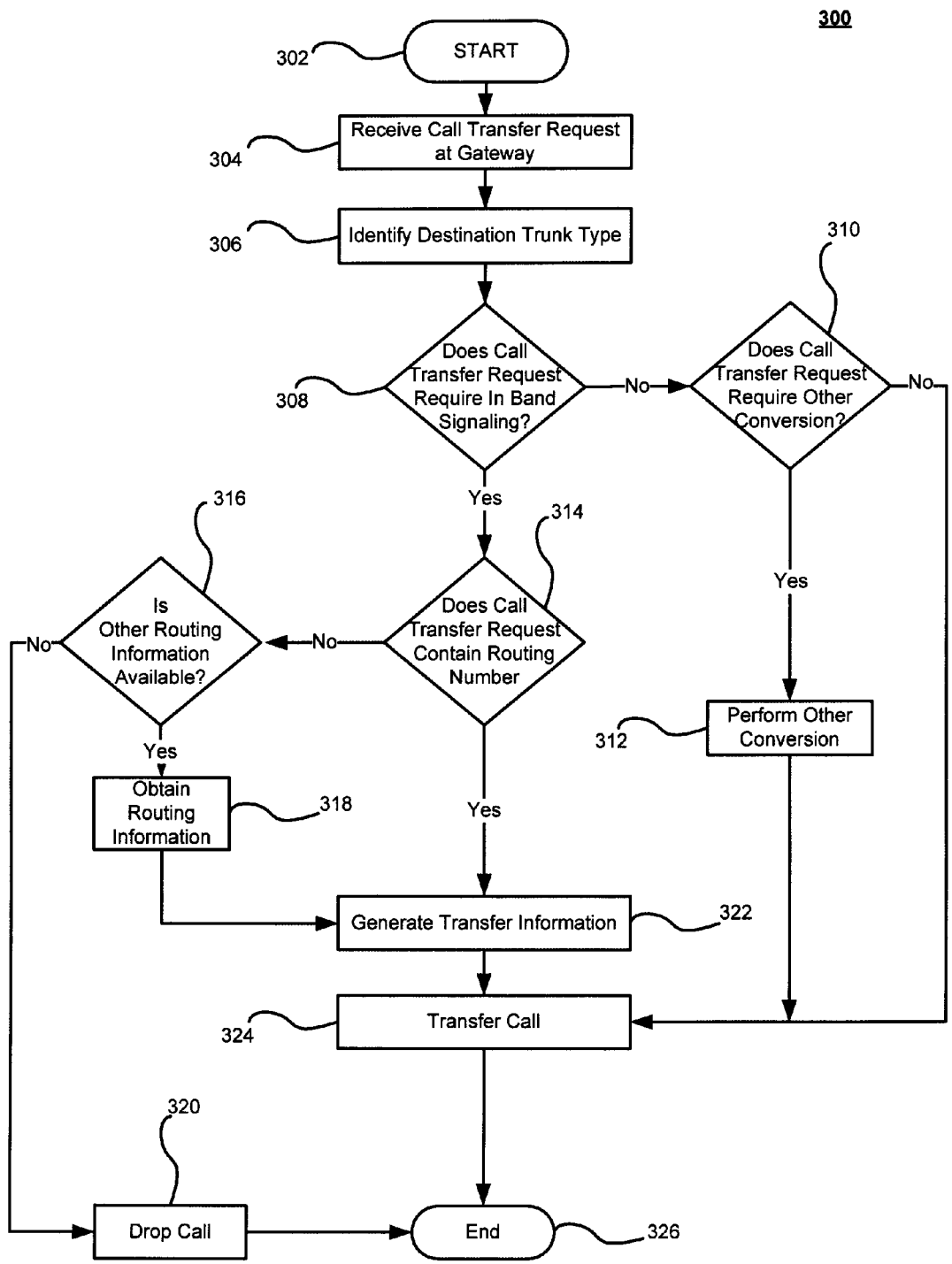
FIG. 3 depicts a flow chart for a method for implementing a trunk independent gateway transfer system, in accordance with an exemplary embodiment.

FIG. 3 depicts a flowchart of a method for implementing a gateway transfer system 300, according to an exemplary embodiment. The exemplary method 300 is provided by way of example, as there are a variety of ways to carry out methods disclosed herein. The method 300 shown in FIG. 3 may be executed or otherwise performed by one or a combination of various systems. The method 300 is described below as carried out by the system 100 shown in FIG. 1 and the gateway transfer module 210 shown in FIG. 2 by way of example, and various elements of the FIGS. 1 and 2 are referenced in explaining exemplary method 300 of FIG. 3, and various elements of FIG. 1 and FIG. 2 are referenced in explaining the exemplary method of FIG. 3. Each block shown in FIG. 3 represents one or more processes, methods, or subroutines carried in the exemplary method 300. A computer readable media comprising code to perform the acts of the method 300 may also be provided. Referring to FIG. 3, the exemplary method 300 may begin at block 302.

At block 304, a call transfer request may be received at a gateway, such as gateway 106. Some gateways may contain a single trunk associated with them and other gateways may contain a plurality of trunks.

At block 306, a trunk may be identified to be used for routing the call. The type of the identified trunk may be determined. For example, gateway 106 may identify the type of trunk to be used based on the configuration of the trunk at the gateway.

At block 308, the control signaling or other formatting used for a call transfer is identified. For example, an application or logic associated with gateway 106 may provide a mapping of trunk types to control signaling or other formatting used for a call transfer. In some embodiments, logic may be associated with each individual trunk of a gateway and may contain signaling information specific to that trunk. If the corresponding trunk type uses in-band signaling, such as trunk 120, the method 300 may continue at block 314. If corresponding trunk type uses out-of-band signaling, such as trunk 122, the method may continue at block 310.

At block 310, a determination may be made as to whether a call transfer requires other preparation or generation of transfer information. The type of trunk, the type of gateway, the type of origin network, or other factors may determine whether generation of other transfer information is required.

If additional call transfer preparation is required the method 300 may continue at block 312. If no additional call transfer preparation is required the method 300 may continue at block 324.

At block 312, additional call transfer preparation may be performed. In one or more embodiments, data of a call transfer request may be parsed and out-of-band control signaling information may be generated. In one or more embodiments, gateway 106 and/or call mapping module 214 may parse a call transfer request to identify a call destination. Gateway 106 and/or call transfer module 216 may prepare call transfer signaling information. For example, the method may prepare call transfer signaling information for trunk 122 which may be a trunk utilizing Two B Channel Transfer (TBCT) or other out of band signaling mechanisms.

At block 314, a determination may be made as to whether a call transfer request contains sufficient routing information to generate call transfer information. If the call transfer request contains sufficient routing information to generate call transfer information the method 300 may continue at block 322. For example, an application running on gateway 106 may parse a call transfer request, which may be a SIP refer request. In some embodiments, if a call transfer request does not contain sufficient routing information, an error may be returned to the call transfer requestor (e.g., an IVR system or an ACD system). In one or more embodiments, if the call transfer request does not contain sufficient routing information to generate call transfer information the method 300 may continue at block 316.

At block 316, a determination may be made as to whether other routing information is available to handle a call transfer request. For example, a gateway, such as gateway 106, may use a lookup table, an array, a database, an interface to a local or remote system, mapping rules or other mapping methods to determine one or more call destinations. If other routing information is available to handle a call transfer request, the method 300 may continue at block 318. If other routing information is not available to handle a call transfer request, the method 300 may continue at block 320.

At block 318, routing tables, interfaces, call request attributes, call information (e.g., DNIS information), transfer requestor information, call origination information and/or logic may be used to obtain other call routing information. For example, gateway 106 may use attributes associated with a call, such as an originating phone number, to determine call routing information.

At block 320, calls for which call routing information has not been identified may be dropped. In one or more embodiments, error messages may be returned to a call transfer requestor and/or a call initiator. For example, if call routing information has not been identified a gateway may drop a call, play an error message to a caller (e.g., redirect a call to an announcement server (not shown)), or route a call to a default call handling center.

At block 322, call transfer information may be generated. For example, gateway 106 and/or call transfer module 216 may generate transfer information. For calls routed on trunks utilizing in-band signaling, one or more DTMF tones may be generated. For calls routed on trunks utilizing in-band signaling, the in-band signaling may be stored as an audio file. For calls routed on trunks utilizing out-of-band signaling other control signaling information may be generated.

At block 324, the call may be transferred. For example, gateway 106 may transmit signaling information generated as described in block 322 which may permit the call to be transferred.

At block 326, the method may end.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A computer implemented method, comprising:
   receiving a call transfer request for a call at a gateway;
   identifying, using a processor of the gateway, a call destination trunk type; and
   determining, using the processor of the gateway, control signaling associated with the call destination trunk type.

2. The method of claim 1, wherein determining the control signaling associated with the call destination trunk type comprises determining whether the call destination trunk type uses in-band signaling or out-of-band signaling.

3. The method of claim 2, further comprising:
   if the call destination trunk type uses out-of-band signaling, determining whether additional call transfer information is required based on at least one of the type of trunk, the type of gateway, and the type of origin network.

4. The method of claim 3, further comprising generating out-of-band control signaling information.

5. The method of claim 2, further comprising:
   if the call destination trunk type uses in-band signaling, determining whether the call transfer request contains sufficient routing information to transfer the call; and
   generating an error message if the call transfer request does not contain sufficient routing information to transfer the call.

6. The method of claim 5, further comprising determining whether other routing information is available to transfer the call based on at least one of a lookup table, an array, mapping rules, a local system interface, and a remote system interface.

7. The method of claim 6, further comprising identifying one or more alternate call destinations.

8. The method of claim 1, wherein the call transfer request comprises a Session Initiation Protocol (SIP) refer message.

9. A non-transitory computer readable media containing computer executable code comprising code to perform the acts of the method of claim 1.

10. A system, comprising:
    a gateway communicatively coupled to a plurality of networks;
    one or more trunks communicatively coupled to the gateway;
    a processor communicatively coupled to the gateway, wherein the processor is configured to execute code associated with at least one of the one or more trunks and the code is configured to cause the gateway to:
    receive a call transfer request for a call;
    identify a call destination trunk type; and
    determine control signaling associated with the call destination trunk type.

11. A system, comprising:
    a network element communicatively coupled to a first network and a second network;
    a processor communicatively coupled to the network element, wherein the processor is configured to:
    receive a call transfer request for a call;
    identify a call destination trunk type; and
    determine control signaling associated with the call destination trunk type.

12. The system of claim 11, wherein the call destination trunk type is identified based on one or more queries of at least one of a lookup table, an array, a database, a local system interface, a remote system interface, and mapping rules.

13. The system of claim 12, wherein at least one of a time of day, a call origination geographic location, a call destination geographic location, a load or utilization of an alternate call destination, caller information associated with a call or priority information associated with a call is used to determine one or more call destinations.

14. The system of claim 11, wherein the processor is further configured to generate a transfer command which comprises in-band signaling tones if the processor determines that the call destination trunk type uses in-band signaling.

15. The system of claim 14, wherein the processor generation of in-band signaling tones comprises at least one of: downloading one or more Dual-Tone Multi-Frequency (DTMF) tones associated with a destination number, generating one or more Dual-Tone Multi-Frequency (DTMF) tones associated with a destination number; receiving one or more DTMF tones associated with a destination number, and concatenating multiple DTMF tones into a single audio file.

16. The system of claim 14, wherein the processor is further configured to generate or receive an appropriate out-of-band control signaling to transfer the call upon determining that a secondary channel for signaling, rather than in-band signaling, is to be used.

17. The system of claim 11, wherein the processor is further configured to generate a transfer command using at least one of: default transfer information, dialed number identification service information associated with the call, and a call mapping data structure.

18. The system of claim 11, wherein the processor is further configured to cancel an original transfer and transfer the call to an alternate call destination.

19. The system of claim 11, wherein the processor is further configured to respond to one or more errors associated with the call transfer request by at least one of:
  error trapping,
  providing information about a failed network component, or
  providing information about one or more call routing errors.

* * * * *